Oct. 11, 1932.  L. Z. NEWCOMB  1,881,873
FOOD SERVER
Filed Dec. 13, 1929
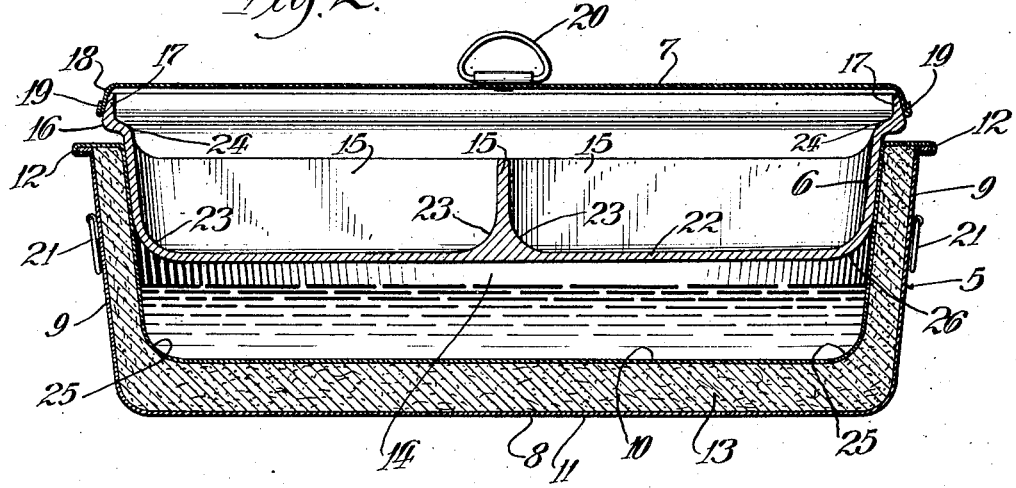
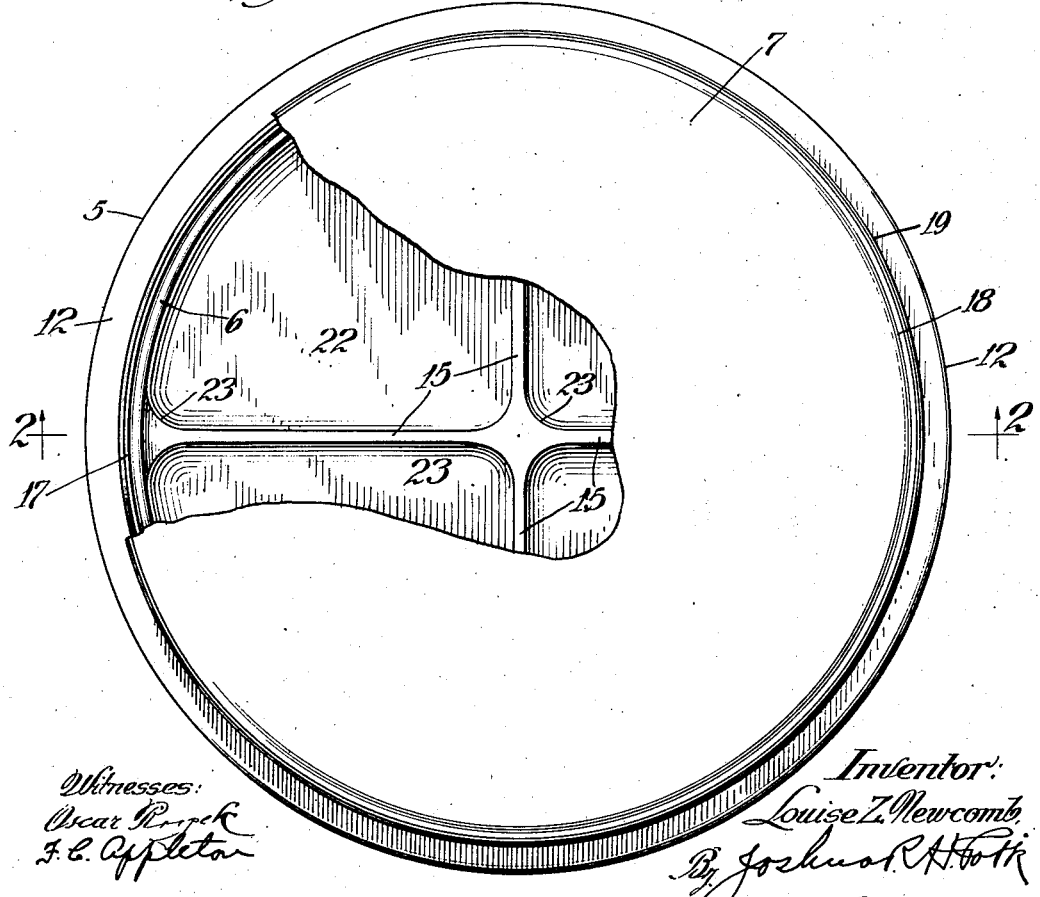
Witnesses:
Oscar R...ck
F. C. Appleton
Inventor:
Louise Z. Newcomb,
By Joshua R. H. ...
her Attorney Patented Oct. 11, 1932

1,881,873

UNITED STATES PATENT OFFICE

LOUISE Z. NEWCOMB, OF WALWORTH, WISCONSIN, ASSIGNOR OF ONE-HALF TO HERMAN U. KREBSER, OF ELGIN, ILLINOIS

FOOD SERVER

Application filed December 13, 1929. Serial No. 413,721.

This invention relates to food servers, and has more particularly to do with a device or utensil for keeping prepared foods either hot or cold until the time to be consumed.

In the home it frequently happens that someone is absent at the regular mealtime, in which case a portion of the food is set aside for later consumption. It is a common practice to merely place the food upon a plate and set the plate in a warming oven or other suitably heated place, or within a refrigerator or cool place, depending whether or not the food is originally prepared hot or cold. Obviously, while the food may be kept hot or cold, as the case may be, it is difficult to preserve it at the proper temperature or in the same palatable condition as originally prepared. Special utensils have been provided for preserving food for a limited time after preparation, but these devices have possessed disadvantages which have precluded them from being used to any considerable extent; among which are relatively high cost, unsanitary construction, and lack of safety in handling.

In addition to the occasional necessity for preserving food for later consumption in the home, as above set forth, there is a need for a practical utensil for use in hospitals and like institutions where it is necessary to feed the patients in their rooms and, of course, where it is highly desirable to serve the food in the same condition in which it is prepared. In hotels it is also customary to furnish guests meals, either hot or cold, in their rooms, occasionally at least.

The present invention has for its objects to produce a simple and inexpensive, yet practical utensil in which foods may be preserved so as to be served in a palatable condition for consumption at a considerable time after preparation; to insure safety in handling the device; to provide for readily cleaning the same and maintaining it in a sanitary condition; and to attain certain advantages which will more fully appear in the following description.

The invention consists in the novel general construction and arrangement of the device and in the particular parts and combinations and arrangements of parts as hereinafter described and pointed out with particularity in the appended claims.

In the accompanying drawing, forming part of this specification and illustrating in a simple structure a practical embodiment of the invention,—

Fig. 1 is a top plan view of the assembled utensil, a portion of the cover member being broken away to show the interior arrangement of the food tray; and Fig. 2 is a diametrical section, taken on or about the line 2—2 of Fig. 1.

Referring now to the drawing, the device therein shown comprises a unitary utensil including a thermal receptacle 5, a cooperating food container 6, and a cover member 7, each of said elements being constructed and correlated as hereinafter more fully set forth in detail.

The thermal receptacle 5 is a pan-like member having preferably a flat bottom 8 and upwardly flaring side walls 9, said member being preferably circular in top plan. The receptacle 5 is double-walled, the inner and outer wall sections 10 and 11 being spaced apart throughout the extent thereof and being seamed and securely sealed at their margins, as at 12, said seamed portion 12 being preferably formed as an external annular ornamental and strengthening bead. The space between the inner and outer wall sections 10 and 11 may be filled with a suitable insulation material 13, or, obviously, there may be dead air space between them; or said space may have a vacuum created therein, according to any desired or approved method of insulating devices of this character.

The annular side walls of the food container 6 are tapered correspondingly to the taper of the inner face of the receptacle 5 so as to fit snugly and be thereby supported within said receptacle 5, and constituting a removable closure for a chamber 14, in which may be placed a suitable heating or cooling agent, as the case may be, preferably water. The food container 6 may be made as a plain dish or tray internally, but, preferably, it is provided with cross partitions 15, dividing it into separate food receiving compartments.

The upper side wall portion 16 of the food container 6 is offset outwardly, providing an annular shoulder portion at the margin of which is an externally tapered flange 17, said flange 17 being provided for the reception thereon of the counterpart tapered marginal flange 18 of the cover member 7, the edge portion 19 of said marginal flange 18 of the cover member 7 being preferably beaded, as shown.

A suitable handle member 20 may be provided for the cover member 7 at the middle thereof, as shown, and the receptacle 5 may obviously be provided with suitable handle members 21.

All corners at the juncture of the bottom 22 of the food container 6 with the side walls and the partitions 15 thereof are formed with well rounded fillets, and all upper corners are likewise well rounded, as at 24. The corner where the bottom and side walls of the receptacle 5 meet is also rounded, as at 25. The rounding of the corners of the several parts of the device facilitates cleansing and maintaining the device in a sanitary condition. The rounding of the outer corner portion 26 of the food container 6 facilitates the insertion of said container into the receptacle 5, the taper of the cooperating engaging annular wall faces being such that said container 6 fits snugly within said receptacle 5 so as to be firmly supported and at the same time afford a sealed closure, which prevents leakage of the liquid heating or cooling agency from the chamber 14, and yet said food container 6 is readily removable from the receptacle 5 at will.

The shell of the receptacle 5 may be made of any suitable material but, preferably, it is constructed of an inexpensive non-corrosive or rust-resistant sheet metal, as is also the cover 7. However, these parts may be constructed of more expensive or precious metal, to suit the purse and desires of the purchaser and user in accordance with other wares of this character. The plate container may be made of any suitable material, porcelain, glass or metal, as desired; it being preferred, of course, to use a material of non-corrosive character which will withstand subjection to high and low temperature.

By insulating the outer receptacle 5 in accordance with the present invention the utensil may be handled without danger from burning or frosting the hands of the user and the prepared food maintained at the same temperature as when originally prepared for a considerable length of time and, furthermore, the original savory and palatable condition of the food is maintained by the provision of the tight fitting cover for the food container, said cover being readily removable, yet it will remain securely in place by reason of the engagement of its peculiarly flared marginal portion with the cooperating tapered portion of the food container.

Obviously, the chamber 14 in the receptacle 5 may contain hot or cold water, or an electrical or other suitable heating element, ice or other cooling medium, and the utensil may be modified considerably in structure without in the least departing from the spirit and scope of the invention as defined by the appended claims. The invention, therefore, is not limited to the exact construction and arrangement shown in the drawing.

Having thus described my invention, what I claim as new and desire to secure by Letters Patent is:

1. A food server comprising a double wall insulated receptacle adapted to contain a thermal agent, said receptacle having an outwardly and upwardly flaring side wall portion, a food container having a correspondingly tapering side wall portion whereby said food container may be detachably inserted into said receptacle and supported therein by engagement between the faces of the adjacent wall portions of the receptacle and container, a circumferentially tapered marginal portion on the upper end of said container, and a cover member having a correspondingly flared marginal portion whereby said cover may be supported upon said container in closed position by means of the engagement between the faces of the adjacent marginal portions.

2. A food server comprising a double wall insulated receptacle adapted to contain a thermal agent, said receptacle having an outwardly and upwardly flaring side wall portion, a food container having a correspondingly tapering side wall portion whereby said food container may be detachably inserted into said receptacle and supported therein by engagement between the faces of the adjacent wall portions of the receptacle and container, the upper end of said wall portion of the container being offset outwardly to provide an annular shoulder portion, an externally tapering flange on the margin of the shoulder portion, and a cover member having a correspondingly tapering marginal portion adapted to be received by the flange of the container, constructed and arranged so that the cover may be held in closed position upon the container by means of engagement between the faces of the adjacent tapering portions.

In testimony whereof I have signed my name to this specification.

LOUISE Z. NEWCOMB.